US008680834B2

(12) United States Patent
Hoogzaad

(10) Patent No.: US 8,680,834 B2
(45) Date of Patent: Mar. 25, 2014

(54) CONTROLLER FOR, AND METHOD OF CONTROLLING, A SWITCHED MODE POWER CONVERTER

(75) Inventor: Gian Hoogzaad, Mook (NL)

(73) Assignee: NXP B.V., Eindhoven (NE)

( * ) Notice: Subject to any disclaimer, the term of this patent is extended or adjusted under 35 U.S.C. 154(b) by 325 days.

(21) Appl. No.: 13/043,127

(22) Filed: Mar. 8, 2011

(65) Prior Publication Data

US 2011/0215784 A1    Sep. 8, 2011

(30) Foreign Application Priority Data

Mar. 8, 2010  (EP) .................................. 10155809

(51) Int. Cl.
*G05F 1/40* (2006.01)
(52) U.S. Cl.
USPC .......................................... 323/285; 327/541
(58) Field of Classification Search
USPC .............. 323/222, 224, 225, 280; 363/16–17, 363/21.07, 21.12, 21.16, 21.17, 56.05, 65, 363/95, 41; 327/172, 541, 543
See application file for complete search history.

(56) References Cited

U.S. PATENT DOCUMENTS

| 5,617,016 | A * | 4/1997 | Borghi et al. ................. 323/284 |
| 6,518,738 | B1 * | 2/2003 | Wang ............................. 323/284 |
| 6,654,893 | B1 * | 11/2003 | Samala ........................ 713/300 |
| 7,170,273 | B2 * | 1/2007 | Sase et al. .................... 323/285 |
| 8,054,058 | B2 * | 11/2011 | Liu et al. ....................... 323/284 |
| 2003/0173941 | A1 | 9/2003 | Harris et al. |
| 2006/0043952 | A1 | 3/2006 | Huang et al. |
| 2008/0252277 | A1 | 10/2008 | Sase et al. |

FOREIGN PATENT DOCUMENTS

WO    2006/018755 A2    2/2006

OTHER PUBLICATIONS

Extended European Search Report for European Patent Application No. 10155809.6 (Aug. 17, 2010).

* cited by examiner

*Primary Examiner* — Rajnikant Patel

(57) ABSTRACT

A method is disclosed for controlling a DC-DC switched-mode power converter comprising a switch, the method comprising, while controlling the switch by a main control loop: detecting a step in a load on the switched-mode power converter; generating a signal in response to the detector detecting a step in the load, and switching the switch in response to the signal. Advantageously, the method may avoid a delay (such as waiting for a subsequent oscillator pulse) which might otherwise occur before switching the switch, to react to the transient. The faster response may result in a reduction of the transient current from the converter, which may facilitate the use of smaller and cheaper components.

A controller configured to operate such a method is also disclosed.

15 Claims, 3 Drawing Sheets

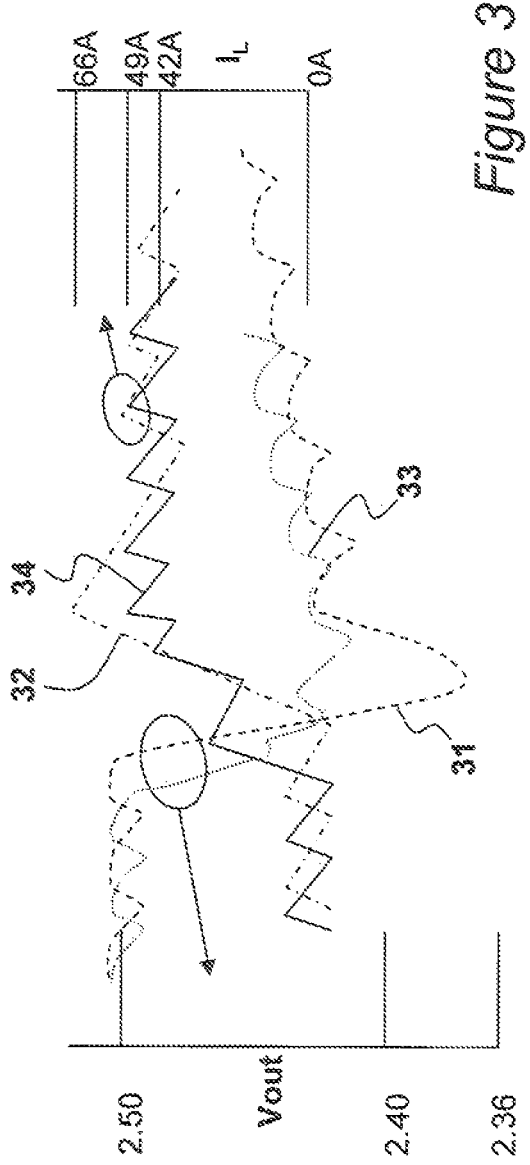
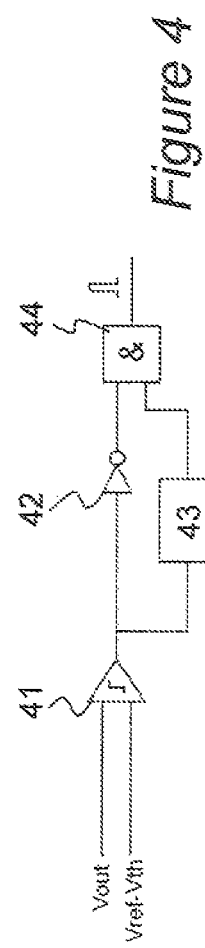
Figure 3
Figure 4

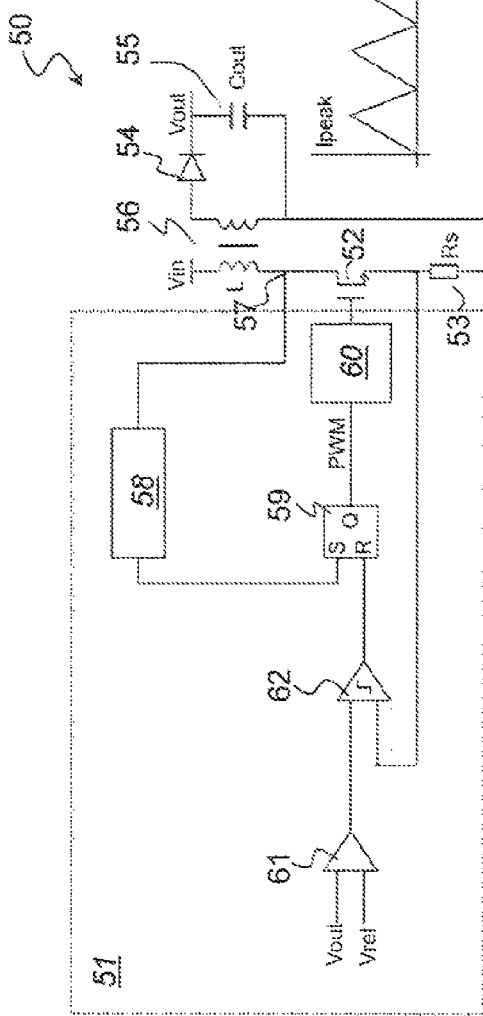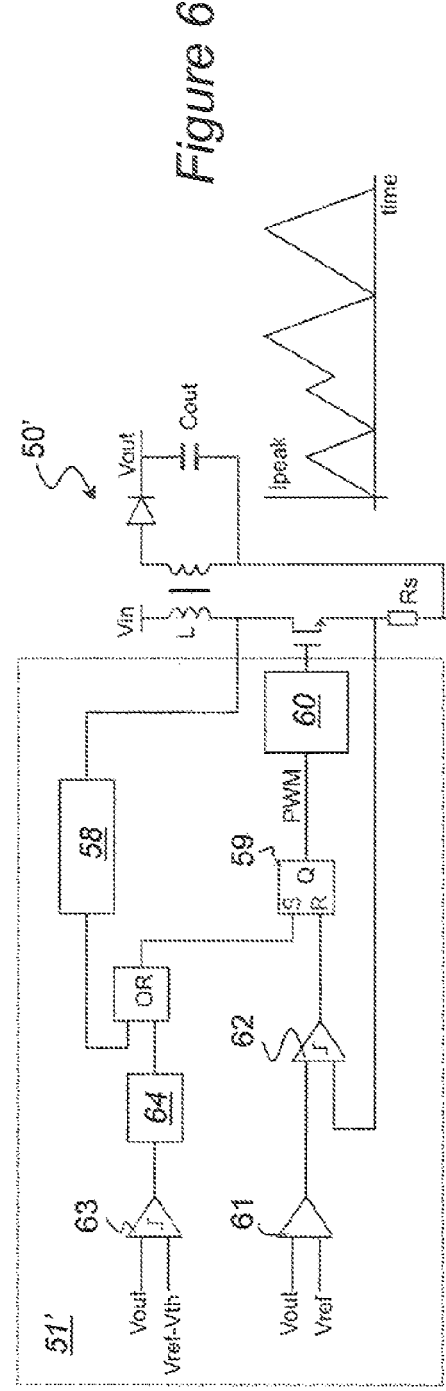

CONTROLLER FOR, AND METHOD OF CONTROLLING, A SWITCHED MODE POWER CONVERTER

CROSS-REFERENCE TO RELATED APPLICATIONS

This application claims the priority under 35 U.S.C. §119 of European patent application no. 10155809.6, filed on Mar. 8, 2010, the contents of which are incorporated by reference herein.

FIELD OF THE INVENTION

This invention relates to switched mode power converters. It further relates to methods for controlling switched mode power converters.

BACKGROUND OF THE INVENTION

Two figures of merit commonly associated with DC-DC switched mode power converters, particularly point-of-load (PoL) converters, are power density (typically measured in $W/m^3$), and power efficiency (defined as the ratio between Power out and Power in). PoL converters are used close to electronic loads such as micro processors, FPGAs, DSPs and memory. They find widespread use in infrastructure applications, such as telecommunications, data communications, data centres, server farms and the like. Power efficiency is important, to reduce undesirable heating close to the load, and to reduce resistive losses of the typically high currents (which can be tens of amps), through routing (for instance PCB tracks) from the converter to the load; power density is important to limit parasitic interconnecting inductances, so as to enable higher frequency switching of the converter and thereby use of smaller passive components.

It is known that, in the dimensioning of components for DC-DC converters, anticipated operational characteristics have to be taken into account: these include not only the steady-state operational currents and voltages, but also non-steady-state currents and voltages which may be encountered under transient conditions. It is not uncommon to encounter currents which exceed the normal steady-state maximum current by 30 to 40% during a transient condition such as the sudden switching in or switching out of a load to the converter. Components such as inductors and output capacitors therefore have to be dimensioned appropriately There is an ongoing requirement for control methods which suppress such transients, but which do not have a negative impact, or have only a reduced negative impact, on converter's power efficiency

SUMMARY OF THE INVENTION

It is an object of the present invention to provide a method of controlling a DC-DC converter with a high power density and a high power efficiency.

According to a first aspect of the invention there is provided a method for controlling a DC-DC switched-mode power converter comprising a switch, the method comprising, whilst controlling the switch by a main control loop: detecting a step in a load on the switched-mode power converter; generating a signal in response to the detector detecting a step in the load, and switching the switch in response to the signal.

Beneficially, since the switch remains under the control of the main control loop, instability of the control may be unaffected. Of course, the invention is not limited to a single power switch, and in many embodiments, the switch will be one of a pair of switches, such as one of a control switch (typically FET) and a sync switch (typically) FET. Other switches, such as, without limitation, bipolar transistors, may be used.

In embodiments, controlling the switch by a main control loop is effected by current-mode control. Alternatively and without limitation, controlling the switch by a voltage control loop is also within the scope of the invention, although since voltage control loops typically require compensation from two output poles rather than the single output pole compensation typically required for current loop control, they tend to be more sluggish, and thus current loop control may, in some circumstances, be preferable.

In embodiments, the current-mode control comprises peak-current control. In other embodiments, other modes of current control may be utilised, such as, without limitation, valley-current control.

In embodiments, a switching frequency of the switched mode power converter is controlled by means of a train of oscillator pulses generated by an oscillator. In embodiments, the train of pulses is input to a "set" input of a flip-flop, and the output of the flipflop is used to control the switch. The signal may comprise a transient pulse which is inserted into the train of oscillator pulses.

In embodiments, generating a signal in response to the detector detecting a step in the load comprises comparing the absolute difference between an output voltage (Vout) and a reference voltage (Vth) with a threshold voltage (Vth), and generating the signal in dependence on the sign of the comparison. The threshold voltage Vth may be predetermined, and in some embodiments more than one threshold voltage may be used. In embodiments, Vth is between 50 mV and 70 mV. Other values for Vth may be used in other embodiments; the value being chosen to suit the particular application, such as will be readily apparent to the skilled person.

According to another aspect of the present invention, there is provided a controller for a switch-mode power converter having a switch, the controller comprising a main control loop for controlling the switch, a detector for detecting a step in a load on the switched-mode power converter, and a signal generator for generating a signal in response to the detector detecting a step in the load, wherein the controller is configured to switch the switch in response the signal.

In embodiments, the main control loop is a current-mode control loop.

In embodiments, the main control loop is an analog loop. In other embodiments, the main control loop is a digital loop; the design choice as to whether a digital or analogue control loop is used will depend on the specific application.

In embodiments the controller further comprises an oscillator for generating a train of oscillator pulses for controlling the switching frequency of the switched mode power converter. The controller may yet further comprise a flip-flop having a "set" input for receiving the train of pulses and an output for controlling the switch. The signal generator may be configured to, in response to the detector detecting a step in the load, insert a transient pulse into the train of oscillator pulses.

In embodiments, the detector comprises a comparator arranged to compare an output voltage (Vout) of the switched mode power converter with a reference voltage (Vth) less a threshold voltage (Vth), and generate the signal in dependence on the sign of the comparison.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which

FIG. 3 is a graph showing output voltage (Vout) and inductor current ($I_L$) for a DC-DC buck converter operating in continuous current mode (CCM) with and without transient suppression according to embodiments of the invention; and FIG. 4 shows a block diagram of one way of providing a one-shot signal or transient pulse;

FIG. 5a is a schematic of a conventional DC-DC flyback converter having a current-mode controller;

FIG. 5b is a graph of the inductor current, when the flyback converter of FIG. 5a is operated under peak current control;

FIG. 6a is a schematic of a DC-DC flyback converter, having a current mode controller, and including transient suppression according to embodiments of the invention, and FIG. 6b is a graph of the inductor current, when the flyback converter of FIG. 6a is operated under peak current control including transient suppression.

Figure 1:
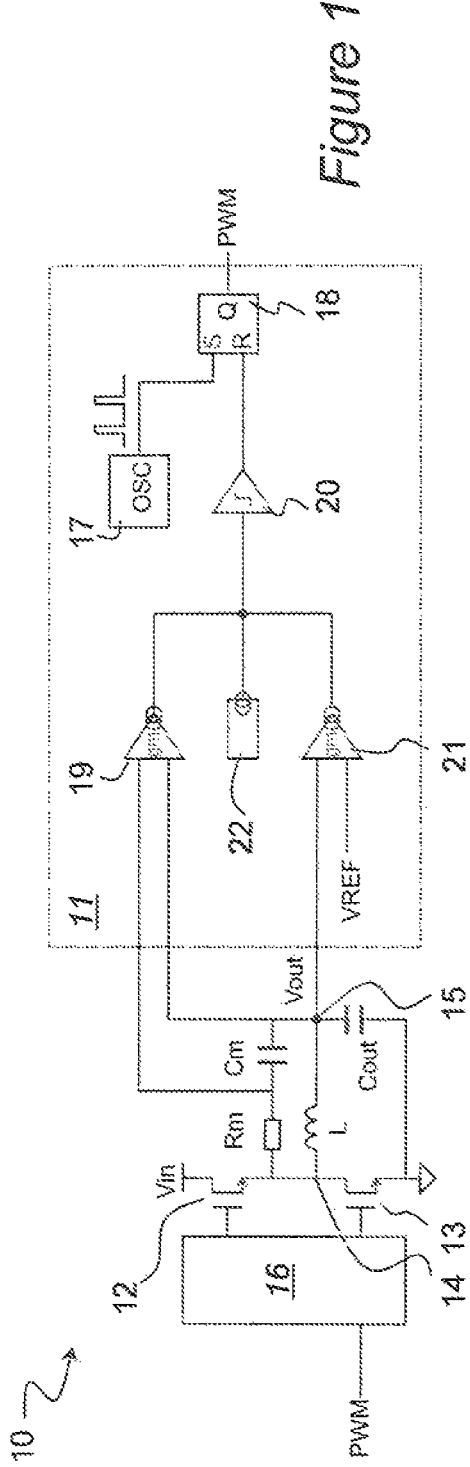
FIG. 1 is a schematic of a conventional DC-DC buck converter having a core current-mode controller.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 is a schematic of a conventional DC-DC buck converter 10 having a core current-mode controller 11. The converter comprises a pair of power devices which may be, as shown, MOSFETs, and in particular a control FET 12 and a sync (or synchronous) FET 13, which are series-connected between an input having voltage Vin and ground, and have a control node 14 (also known as half-bridge node) therebetween. Control FET 12 and sync FET 13 are also known as high side FET and low side FET respectively, since turning the control FET "on" has the effect of raising the voltage at the control node 14 to Vin (less the $V_{DS}$ of control FET 12). Conversely turning "on" the sync FET 13 has the effect of lowering the control node voltage to ground (or, more accurately, to the Vds of sync FET 13). An inductor L is connected between the control node 14 and an output node 15, at which output node the voltage is Vout. Also connected between output node 15 and control node 14 is a series arrangement of a capacitor Cm and a resistor Rm, for determining the inductor current $I_L$ through inductor L. A capacitor Cout is connected between the output node 15 and ground.

The controller 11 operates to control the drivers for both FETs 12 and 13, which drivers may be, as shown in FIG. 1, a single driver block 16. In operation under current-mode control, the controller 11 comprises three distinct parts: an inner cycle-by-cycle loop, controlling the inductor current; a voltage reference outer loop and a frequency control block.

This exemplary synchronous implementation is typical for PoL converters. In such an implementation, the control and sync FETs 12 and 13 are alternately switched on. While control FET 12 is on, sync FET 13 is off, and vice versa. The controller provides a PWM (pulse wave modulated) signal to the driver block 16. The PWM signal determines when the control FET should be turned on (and the sync FET turned off) and when it should be turned off (and the sync FET turned on). The driver block 16, or controller 11, further adjusts the moments when the FETs should be turned on and off to ensure there is a dead space between each FET being "on"; this is necessary to ensure that at no time the input is connected directly to ground, which could otherwise be the case since charge does not instantaneously stop flowing when the FETs are turned off.

The frequency of operation of the converter is the inverse of the time interval between two consecutive times the control FET is turned on. This frequency is determined by oscillator OSC 17. Oscillator 17 provides a train of pulses to the "set" input of a SR flip-flop 18. The SR flip-flop 18 is reset dominant, so the oscillator pulse only sends output Q of flip-flop 18 high when the reset input is low. Provided this condition holds, the oscillator pulse determines the next turn-on of the control FET. So, the conversion frequency is equal to the oscillator frequency.

The "mark-space ratio" of the control is controlled by the first control loop, also referred to as the inner loop—which in the case of current mode control is based on the current $I_L$ through the inductor L and is thus a current loop. The current loop requires a current sensor to provide repeatable cycle-by-cycle current information; this current information does not need to be particularly accurate. In the embodiment of FIG. 1 peak-current control is used, and the capacitor-resistor combination of Cm and Rm forms the current sensor, to provide current information, inter alia during the primary stroke during which the inductor L is being charged. In this embodiment, so-called DCR current sensing is implemented, which uses the inherent series resistance of the inductor to sense the inductor current. The inductor current information $I_L$*DCR is copied across the parallel capacitor Cm, which is true for all frequencies when Rm.Cm equals L./DCR. (If the time constants of the parallel filter and the coil are not exactly matched, then the AC gain of the current sense will differ slightly from the DC gain, although this is not a problem for the control loop). The voltage across the capacitor Cm thus provides inductor current information, which information is converted to current by the transconductor 19 and subtracted from the setpoint output of transconductor 21, to trip comparator 20, and provide a "reset" input to flip-flop 18. Thus, at a certain peak current, the comparator will trip to reset the SR flip-flop.

This inner current control loop is cycle-by-cycle and may be stabilised by a slope compensation block 22.

The voltage reference loop, or outer loop, ensures that the converter provides a desired output voltage Vout which is equal to a reference voltage Vref: the difference between the voltage Vout at the output mode 15 and the reference voltage Vref is amplified by a difference (or error) amplifier 21. Error amplifier 21 (which as shown, may be a transconductor) may include filtering such as will be immediately apparent to the skilled person (not shown in FIG. 1). For example, when the filter of the error amplifier includes an integrator, then the open-loop DC gain is infinite, and no closed-loop DC error is present between Vout and Vref. This configuration is standard compensation strategy in loop design, for example for converters, servo's, phase-locked-loops, etcetera, and will be readily familiar to the skilled person.

Figure 2:
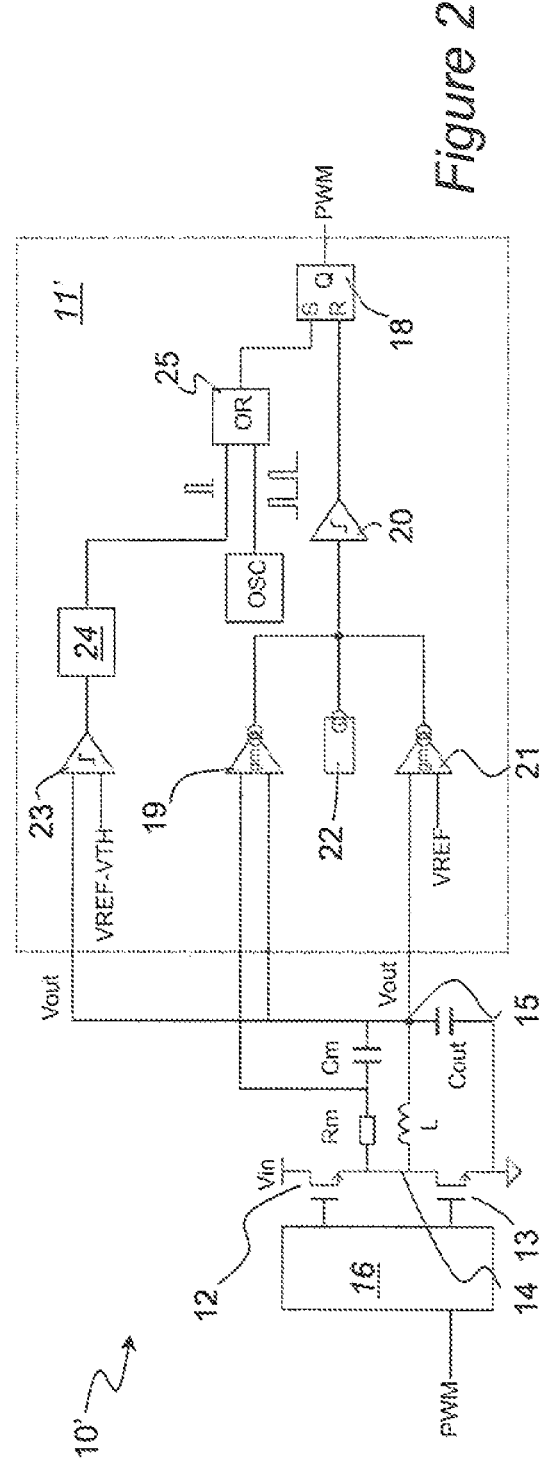
FIG. 2 is a schematic of a DC-DC buck converter, having a core current mode controller, and including transient suppression according to embodiments of the invention.

FIG. 2 shows a schematic of a DC-DC buck converter, having a core current mode controller, and including transient suppression according to embodiments of the invention. The converter 10' and controller 11' are similar to the conventional arrangement shown in FIG. 1, and operate in a similar manner in steady-state conditions; however, under transient conditions the operation is different as will be described below.

The controller of FIG. 2 includes a voltage detector 23 which identifies a negative-going transient on Vout, by means of comparing Vout with [Vref−Vth], where Vth is a predetermined threshold voltage. On detection of a transient, that is to say, if the output voltage falls more than Vth below Vref, voltage detector 23 goes high. Interrupt generator 24, to which the output of voltage to the 23 is connected, then produces a single pulse, or transient pulse, which is "OR"-ed, by means of logic 25, with the train of oscillator pulses output from the oscillator 17. This additional pulse to the set input of SR flip-flop 18 results in that the controller does not have to wait for a (regular) oscillator pulse, before it can go high, in the case of a negative going Vout transient. As a result, the high side control FET 12 may be turned on almost immediately after the voltage detection threshold is tripped (that is to say, as soon as it is determined that Vout<Vref−Vth).

For positive-going transients, the comparator 20 will immediately, or almost immediately, reset the flipflop 18 so the switch is switched without a delay—which is the same as the case for conventional methods as described in FIG. 1. So, in this implementation, the invention is useful for negative-going transients, and unnecessary for positive-going transients. For other implementation, the inverse applies.

Consequently, for both transient load step directions, the controller exhibits conceptually good behaviour.

Beneficially, the transient response does not need to take over full control from the inner control loop: rather, a further "set" command, which is similar to or even identical with the regular set commands from the oscillator, is provided. This extra command (also termed herein "transient signal" or "transient pulse"), has, therefore, no adverse impact on the stability of the controller.

The response of an exemplary DC-DC converter to step changes in load, with and without transient suppression according to embodiments of the invention, will now be considered in more detail. Consider first the transient load step from a higher current, such as 40 A, to a lower current such as 0 A. The controller will experience an output voltage that rises above Vref: at the moment of the transient load step, the conductor is still charged at 40 A while the load connected to Vout no longer requires any current; consequently, the inductor current will be redirected to the output capacitor Cout, which will charge up. Thus, Vout will rise. The error amplifier will immediately amplify the difference between this higher output voltage and Vref, yielding a lower setpoint for the peak current, on the inner control loop. The sensed inductor current will thus more quickly surpass the peak current setpoint than would otherwise have been the case, and on doing so this will trip the comparator to reset the SR flip-flop. This will turn off the high side switch and on the low side switch, to discharge the inductor. Thus, even without transient suppression according to embodiments of the invention, the behaviour, for a load step from high to low current, is conceptually good. Of course, the skilled person will appreciate that it can be improved by minimising the circuit delays, such as is common practice in this field.

Consider now the case of a transient load step from a lower current such as 0 A to a higher current such as 40 A; for a controller, which does not have transient suppression according to embodiments of the invention. In this case, the controller will experience an output voltage that drops below Vref: at the moment of the transient load step, the inductor is still fully discharged at 0 A, while the load connected to the output suddenly desires a large current (in this case 40 A); so, the load current will discharge Cout, which results in a fall in Vout. The error amplifier will immediately amplify the difference between this lower output voltage Vout and Vref, resulting in a higher set-point for the peak current. This almost immediately results in the situation where the peak current setpoint is higher than the sensed inductor current (if this was not already the case), which will trip the comparator, to release the reset condition on the SR flip-flop. Note that the flip-flop is reset dominant. However, in this case, the high side control FET will not be turned on immediately: rather, it still has to wait for the oscillator pulse to set the flip-flop. This behaviour is conceptually non-ideal, but maybe avoided by means of embodiments of the invention, as has been mentioned above with reference to FIG. 2.

That is to say, in embodiments of the invention, once it is detected that the output voltage Vout has fallen below the Vref by a predetermined amount, in this case Vth, the flip-flop is set, not by the regular oscillator pulse, but by an additional pulse—the transient pulse—which is inserted into the train of oscillator pulses.

The threshold voltage Vth, used by the comparator to trigger the single-shot transient pulse may be determined from the steady-state ripple voltage on Vout, plus a safety margin, to accommodate noise, etc. Thus tripping of the transient detector during normal steady-state operation of the converter may be prevented. Values of Vth in the range of 50 mV to 70 mV have been established by simulation to be effective, for an example PoL converter. The exact value of Vth may not be critical. And other values may be chosen, depending on the specific application.

FIG. 3 is a graph showing output voltage (Vout) and inductor current ($I_L$) for a DC-DC buck converter operating with and without transient suppression. In these example simulations, the converter is operated in current mode, and is working in continuous conduction mode (CCM). First, consider the output voltage Vout 31 and inductor current $I_L$ 32, for the converter operating without transient suppression. The current ripple, that is to say the magnitude of the sawtooth on the current, is the same at 0 A, before the transit, as at 40 A after the transient. A near "worst-case" timing for the moment of the load-step, relative to the SMPS switching cycle, is shown, and it is seen that of the output voltage falls from around 2.50V to about 2.36V (with a maximum dip of about 150 mV) during the transient resulting from the load change. Meantime, there is a relatively long uninterrupted increase in the inductor current, which results in an overshoot in current, to around 65 A—which corresponds to a more than 60% overshoot.

The output voltage Vout and inductor current $I_L$, corresponding to the converter being operated with transient suppression according to an embodiment of the invention, are shown at graphs 33 and 34 respectively. The voltage no longer exhibits such a large dip, since once it falls below the reference value of 2.5V by more than 50 mV, that is to say more than Vth, the transient pulse is generated. As a result, the inductor current 34 does not undergo such a large transient, and in this case peaks at around about 49 A. Relative to the case where there is no transient suppression, there is an improvement, that is to say, a reduction, in the dip in Vout by around 37%, and a reduction in the peak inductor current by around 25%.

FIG. 4 shows a block diagram of an exemplary means of providing a one-shot signal or transient pulse. The figure shows a comparator 41 which compares the output voltage Vout with the reference voltage less the threshold voltage (Vref−Vth). It should be noted that this arrangement is suitable for negative-going transients; for the case of positive-going transients, the comparison is made between Vout and (Vref+Vth). In either case the comparison is made to detect whether the absolute difference between Vout and Vref exceeds the threshold voltage Vth, that is to say, whether:

$$|Vout-Vref|>Vth.$$

Comparator 41 detects the transient. Upon the detection of a transient the output of comparator 41 goes high, and this output is directed both to an inverter 42 and the delay circuit in block 43. The outputs from inverter 42 and delay circuit 43 are connected as the two inputs to "AND" logic 44. The output from the AND logic 44, thus comprises the "single-shot" or transient pulse, which starts when the transient is detected, and lasts for a duration which is determined by the delay block 43.

A simplified schematic of a flyback converter is shown in FIG. 5a, and a further intervention embodiment of the invention, applicable to such a converter, is shown in FIG. 6a. As will be familiar to the skilled person, the flyback converter 50 is based on a single power switch 52 on the primary side of a transformer 56. The switch 52, along with a sense resistor Rs 53 is connected between the primary coil L of the transformer and ground; the input voltage Vin is connected to the other side of the primary coil L. The secondary side circuit includes a diode 54 in series with the transformer 56, resulting in output voltage Vout, and an output capacitor Cout 55 connected across the diode and the transformer's secondary coil. Of course, the skilled person will appreciate that flyback converters are typically used for isolated applications, and thus normally some isolation will be provided between the secondary and primary circuits; however, to aid the understanding of the invention, this is not shown in FIG. 5, which rather shows a short between the primary and secondary grounds.

Controller 51 for the flyback converter comprises two loops: an inner cycle-by-cycle loop uses peak current control, whilst the outer loop sets the Ipeak level for the inner loop and regulates to the desired output voltage Vout.

Thus, the inner loop includes the valley detection block 58, which detects a valley voltage at the control node 57 between the primary inductor L and power switch 52. On detection of a valley, the valley detection block 58 sends the "set" input to the SR flip-flop 59 high. Output of flip-flop 59 sends a PWM signal to driver 60 to drive the power switch 52.

The outer control loop comprises an error amplifier 61, which compares the output from the converter, Vout with a reference level Vref. The current Ipeak, is determined using voltage across the sense resistor Rs 53, which is compared by comparator 62 with the output from the error amplifier 61. The peak current is thereby controlled in order to maintain that the output voltage Vout corresponds to the reference voltage Vref.

In FIG. 5b is shown the inductor current plotted against time, for a flyback converter 50 as shown in FIG. 5a, operated by means of the controller 51, in the case of an increase in load current at the output Vout. As shown, the converter is operating in boundary conduction mode (BCM), such that the switch 52 is opened immediately the inductor current drops to zero.

It will be appreciated that, in practical embodiments, the converter shown in FIG. 5 would employ either secondary side isolation together with communication across the isolation, or primary side sensing, both of which will be well known to the skilled person, although these have been omitted in the figure.

FIG. 6a shows flyback converter 50' including a controller 51', which is adapted so as to operate according to embodiments of the invention. Similar to the controller 51, controller 51' includes two control loops: an inner current loop comprising valley detection circuitry 58 and flip-flop 59 to control PWM driver circuit 60, and an outer voltage control loop comprising error amplifier 61 and Ipeak comparator 62. However, this controller includes a transient detector 63, which compares the output voltage Vout with the reference voltage less threshold voltage, that is to say, with Vref−Vth. Upon detection of a transient (such that the absolute difference between Vout and Vref exceeds the threshold voltage Vth), interrupt generator 64 is triggered to generate a single-shot transient pulse. This transient pulse is inserted into the inner current controller loop by means of "OR" logic 65, situated between the valley detection circuitry 58 and the flip-flop 59 "set" input.

FIG. 6b shows a graph of the inductor current for the converter 50' operated by means of controller 51', which is subject to a sudden change in load. The figure shows that, although the converter is operating under boundary conduction mode conditions (BCM), upon detection of the voltage transient due to the sudden load change in load current, the switch driver does not wait for the inductor currents to fall to zero before closing the switch 52, but rather, upon detection of the transient, the flip-flop outputs a control signal to the switch driver to close the switch, typically immediately. It will be appreciated that since the switching occurs before the inductor current reaches zero, there will be some "hard switching" losses; however, compared to the advantages obtained or obtainable by means of reducing the overshoot due to the transient, these losses are generally acceptable.

The skilled person will appreciate that the embodiment above has been described in relation to a valley switching, which typically for a flyback converter yields minimum switching losses. However, the invention is not so limited, but encompasses other switching modes. Further, the invention is not limited to boundary conduction mode, but encompasses both CCM and discontinuous conduction mode (DCM). Moreover, the skilled person will appreciate that in a converter operating as just described, there is no oscillator, and so, in such embodiments, there is limited benefit in using a fast clock, as there is not a clock running at the switching frequency.

In the embodiments described above, the pulse which triggers the early switching of the switch is asynchronous to the SMPS. That is to say, the controller loops does not need to wait for any clock signal, prior to initiating the response. However, in other embodiments, the controller may operate in a synchronous fashion, based on a clock which is running faster than the frequency of the SMPS. For instance, it will be immediately apparent to a skilled person that the transient pulse may be the result of the next clock cycle of a fast clock, subsequent to the detection of the transient, using a fast clock which is running at some multiple of the SMPS clock. In this case, the SMPS clock may be derived directly or indirectly from the fast clock.

The embodiments described above relate to the negative-going transients. In the other embodiments, the transient is a positive-going transient: as an example, consider a DC-DC buck converter, which is operating under current mode control using valley current detection, for instance in continuous conduction mode (CCM). In this mode of operation, the turn-on moment of the control FET is determined by the valley current criteria, and the turn-off moment of the control FET is determined by the oscillator (which, it will be appreciated, is the inverse of the arrangement described with reference to FIG. 2). As a result, if there is a sudden increase in load power, the control FET can be rapidly switched on using conventional control methods not having transient suppression according to embodiments of the invention. However, under this arrangement, using conventional control methods the turn-off can be impaired by having to wait for the oscillator. Thus, in this case there is a positive going transient. This may be suppressed in embodiments of the invention by detecting the positive-going transient, and switching off the control FET in response to the detection, for instance by means of a single-shot transient pulse being inserted to into the train of pulses from the oscillator, in a way which is directly analogous to that described in relation to the embodiment shown in FIG. 2.

In summary, then, from one viewpoint, a method is disclosed above for controlling a DC-DC switched mode power converter comprising a switch, the method comprising, whilst controlling the switch by a main control loop: detecting a step in a load on the switched-mode power converter; generating a signal in response to the detector detecting a step in the load, and switching the switch in response to the signal. Advantageously, the method may avoid a delay (such as waiting for a subsequent oscillator pulse) which might otherwise occur before switching the switch, to react to the transient. The faster response may result in a reduction of the transient current from the converter, which may facilitate the use of smaller and cheaper components. A controller configured to operate such a method is also disclosed above.

From reading the present disclosure, other variations and modifications will be apparent to the skilled person. Such variations and modifications may involve equivalent and other features which are already known in the art of switched mode power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method for controlling a DC-DC switched-mode power converter comprising a switch, the method comprising, while controlling the switch by a main control loop:
   detecting a step in a load on the DC-DC switched-mode power converter, wherein the step in the load is either a positive-going transient or a negative-going transient;
   generating a signal in response to the detector detecting the step in the load; and
   switching the switch in response to the signal.

2. The method of claim 1, wherein the controlling the switch by a main control loop is achieved by current-mode control.

3. The method of claim 2, wherein the current-mode control comprises peak-current control.

4. The method of claim 1, wherein a switching frequency of the switched mode power converter is controlled by means of a train of oscillator pulses generated by an oscillator.

5. The method of claim 4, wherein the train of oscillator pulses is input to a "set" input of a flip-flop, and the output of the flip-flop is used to control the switch.

6. The method of claim 4, wherein the signal comprises a transient pulse which is inserted into the train of oscillator pulses.

7. The method of claim 1, wherein generating the signal in response to the detector detecting the step in the load comprises:
   comparing an absolute difference between an output voltage (Vout) and a reference voltage (Vref) minus a threshold voltage (Vth); and
   generating the signal in dependence on a sign of the comparison.

8. The method of claim 7, wherein Vth is between 50 mV and 70 mV.

9. A controller for a switched-mode power converter having a switch, the controller comprising:
   a main control loop configured to control the switch;
   a detector configured to detect a step in a load on the switched-mode power converter, wherein the step in the load is either a positive-going transient or a negative-going transient; and
   a signal generator configured to generate a signal in response to the detector detecting a step in the load, wherein the controller is configured to switch the switch in response the signal.

10. The controller according to claim 9, wherein the main control loop is a current-mode control loop.

11. The controller according to claim 9, wherein the main control loop is an analog loop.

12. A controller according to claim 9, further comprising:
   an oscillator configured to generate a train of oscillator pulses and control a switching frequency of the switched mode power converter.

13. The controller according to claim 12, further comprising:
   a flip-flop, having a "set" input, configured to receive the train of oscillator pulses and an output to control the switch.

14. The controller according to claim 13, wherein the signal generator is configured to, in response to the detector detecting a step in the load, insert a transient pulse into the train of oscillator pulses.

15. The controller according to claim 9, wherein the detector comprises:
   a comparator configured to compare an output voltage (Vout) of the switched-mode power converter with a reference voltage (Vref) minus a threshold voltage (Vth), and generate the signal in dependence on a sign of the comparison.

* * * * *